US006909499B2

(12) United States Patent
Sander

(10) Patent No.: US 6,909,499 B2
(45) Date of Patent: Jun. 21, 2005

(54) LIGHT SOURCE FOR ILLUMINATION IN AN OPTICAL VIEWING DEVICE

(75) Inventor: Ulrich Sander, Rebstein (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 0 days.

(21) Appl. No.: 10/267,532

(22) Filed: Oct. 9, 2002

(65) Prior Publication Data

US 2003/0071991 A1 Apr. 17, 2003

(30) Foreign Application Priority Data

Oct. 11, 2001 (DE) ........................................ 101 50 270

(51) Int. Cl.[7] ............................ G01J 1/12; G01B 11/00
(52) U.S. Cl. ...................................... 356/230; 356/394
(58) Field of Search ............................... 356/230, 394, 356/213, 218, 227, 229, 231; 250/208.2, 208.6, 226, 227

(56) References Cited

U.S. PATENT DOCUMENTS

| | | | | |
|---|---|---|---|---|
| 3,996,494 A | * | 12/1976 | Suga | ........................ 315/151 |
| 4,657,013 A | * | 4/1987 | Hoerenz et al. | ............... 606/4 |
| 4,707,609 A | | 11/1987 | Shimamura | |
| 5,446,277 A | * | 8/1995 | Rutter | .................... 250/214 R |
| 5,495,329 A | * | 2/1996 | Anderson et al. | ........... 356/218 |
| 5,818,575 A | * | 10/1998 | Creighton | ................... 356/222 |
| 5,861,944 A | | 1/1999 | Nishi | |
| 6,366,350 B1 | * | 4/2002 | Thornburg et al. | ......... 356/222 |
| 6,456,373 B1 | * | 9/2002 | Wienecke et al. | .......... 356/218 |

FOREIGN PATENT DOCUMENTS

| | | |
|---|---|---|
| DE | 19824423 A1 | 12/1999 |
| JP | 07022797 A | 1/1995 |
| JP | 08146303 A | 6/1996 |

OTHER PUBLICATIONS

Zeiss brochure "OPMI® VISU 200 for Ophthalmology", Document No. 30–251–d, publication annotation IV/98, Apr. 1998.

* cited by examiner

Primary Examiner—Michael P. Stafira
(74) Attorney, Agent, or Firm—Hodgson Russ LLP

(57) ABSTRACT

The invention concerns a light source having an apparatus for measuring the brightness of the illumination system of an optical viewing device, for example a microscope, in which at least one light sensor (3a) for measuring the intensity of the lamp (1) is arranged, for example, next to the optical waveguide (2). That measurement can be passed on to the user (9), either acoustically or visually, via an electronic unit (4) which compares the measurement to a definable threshold value.

4 Claims, 1 Drawing Sheet

LIGHT SOURCE FOR ILLUMINATION IN AN OPTICAL VIEWING DEVICE

CROSS REFERENCE TO RELATED APPLICATIONS

This application claims priority of the German patent application 101 50 270.2 filed Oct. 11, 2001 which is incorporated by reference herein.

FIELD OF THE INVENTION

The invention concerns a light source for illumination in or for an optical viewing device, for example a microscope.

BACKGROUND OF THE INVENTION

In the illumination devices that are presently common for surgical microscopes, halogen lamps are usually used for specimen field illumination. On the one hand these have a limited lifetime until total failure, and on the other hand the lamp's brightness decreases drastically in the course of its service life as a result of filament material deposited onto the lamp body.

It is known from U.S. Pat. No. 4,657,013 to use a dosimeter for patient protection in order to prevent excessive irradiation of the patient. In order to protect against a total failure of the lamp (with unforeseeable consequences) during an operation, it is proposed in the Zeiss brochure "OPMI® VISU 200 for Ophthalmology," document no. 30-251-d, publication annotation IV/98, April 1998, to use a lamp changer which switches over immediately to a replacement lamp upon failure of the first lamp.

Operating hour counters are used to track the lifetime of xenon lamps, which are also used in microscope illumination systems. These counters are intended to allow operating personnel to replace the lamp after a specific number of operating hours has elapsed, so that it does not fail unexpectedly.

The inventor has recognized that the known systems are disadvantageous in the following ways:

a) After the lamp has aged to a specific degree, the operator (surgeon) justifiably complains about a lack of brightness in the surgical field, even though all the supply systems (electronics, light guide, optical coupling into the microscope) are OK.

b) This can even proceed to the point that the entire microscope is labeled as "bad" and unusable.

c) Advisories in the operating instructions explaining this effect are in practice seldom noted, or often are also not kept in mind at the critical moment in a hectic surgical situation.

d) In order to compensate for the brightness loss, as a rule the voltage is simply increased by turning the potentiometer or the light controller. This can result in a brightness shock when the lamp is changed, since the new, unused lamp is substantially brighter than the old one at the same voltage setting. In ophthalmology, this can result in damage to the patient's eye.

e) Except in the case of the operating hour counter system, it is not possible for maintenance personnel to predict when a lamp needs to be replaced before it fails at an inconvenient time.

f) Operating hour counters are designed only for average lamp outputs, and do not indicate the actual need for lamp replacement.

SUMMARY OF THE INVENTION

It is the object of the invention to create an apparatus which monitors the light source, for example a halogen lamp, over its entire lifetime and indicates the need for a lamp change to the surgeon or to maintenance personnel in good time, with no need to count operating hours.

This object is achieved by way of the method and the apparatus described below:

The actual light output of the lamp is monitored by means of a monitoring sensor. A decrease in the lamp's output over the period of its use indicates to the sensor when the lamp's condition is approaching a critical phase. The fact that the critical phase has been reached is signaled to the user or the maintenance personnel.

In the illumination assemblages that are common today, light (which is often generated by cold light reflector lamps) is focused onto a light guide entrance. The light guide transports the light through an optical system in the microscope onto the surgical field. The actual light cone of the cold light lamp, however, is larger than the light guide entrance, although it becomes dimmer toward the edge. According to the present invention, that portion of the light cone is utilized by a light sensor that is located beside the light guide, and is continuously measured in terms of its brightness.

The sensor's signal is conveyed in conventional fashion to a signal-processing electronic system. If a threshold value in terms of light reduction or increase, which preferably is unrestrictedly selectable and can optionally be adjustable at the electronic system, is then reached, i.e. if the light intensity falls below or rises above a specific value, an optical indication and/or an acoustic signal is activated. These/this indicate(s) that the quantity of light being emitted is no longer sufficient for surgery, and that a lamp change should be performed. A lamp changer could now be operated, for example, or the lamp could also be replaced in conventional fashion. The signal can also be used to control the lamp change automatically.

As a particular development, a calibration apparatus is integrated into the electronic unit, allowing the measured value for a new lamp to be set to a value of 100% so that the light reduction threshold value can then be entered as a percentage, for example 60%.

The corresponding measurements and calculations are boosted by the electronic system to the regulation voltage that is optionally present, so that the measurements and calculations can be objectivized.

The indication can be configured, for example, as a blinking red signal light, as a signal tone, or as a reading on an instrument (scale), preferably on the microscope's lamp electronics. It is also possible to make the indication directly visible to the operator in the intermediate image of the surgical microscope, by way of a reflecting-in apparatus that is already known and present.

In a further exemplary embodiment, the light sensor is arranged behind the lamp's cold light reflector rather than next to the optical waveguide. Since the reflectors that are used reflect only in the visible region but allow light to pass in the remaining spectral region, a measurement is possible here as well (albeit in a different spectral region). But since the spectral region (thermal radiation) is directly proportional to the light output at the filament, this preferred configuration is highly appropriate.

The improvement in light sources described above, using an apparatus for monitoring the light source of an optical viewing device, yields the following advantages:

The user is informed in good time when the light intensity of the light source no longer corresponds to the initial intensity or is approaching a predefined attenuation threshold value.

A signal is given in advance when the lamp is approaching a total failure.

The possibility exists of replacing the lamp before the total failure, constituting an additional safety aspect.

Self-monitoring of the illumination apparatus of the microscope is achieved.

The possibility exists of keeping the illumination intensity constant, by means of a control system, over a specific portion of the lamp's lifetime.

BRIEF DESCRIPTION OF THE DRAWINGS

The invention will now be explained in more detail with reference to a drawing. The single FIGURE (FIG. 1) shows the schematic configuration of an illumination apparatus according to the present invention.

DETAILED DESCRIPTION OF THE INVENTION

Figure 1:
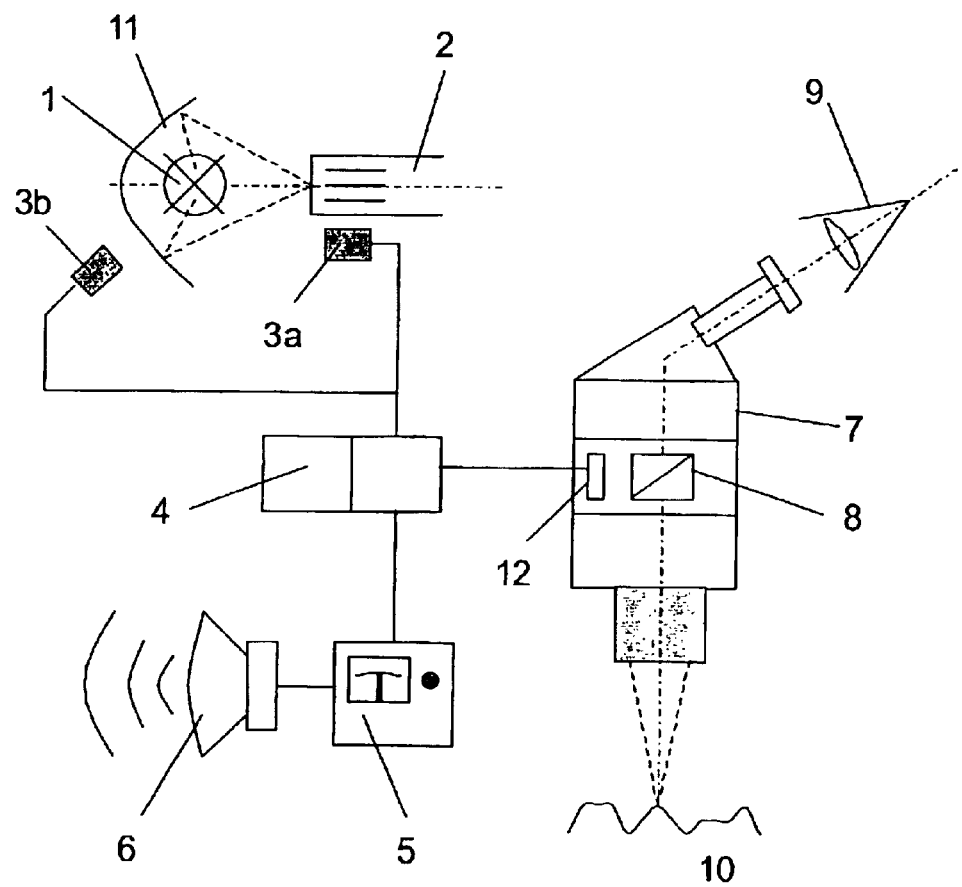

FIG. 1 shows a light source of the present invention for a microscope 7, for example a surgical stereomicroscope. The light source has a lamp 1, an optical waveguide 2, and a cold light reflector 11 for focusing the light generated by lamp 1 onto the entrance of optical waveguide 2. Also depicted are light sensors 3a, 3b according to the present invention for measuring the intensity of the light generated by lamp 1, an electronic unit 4, an indication and brightness adjustment system 5, an acoustic signal generator 6, a reflecting-in unit 8 for reflection of light into microscope 7, an indication unit 12 for user 9, and specimen 10.

Light sensors 3a, 3b can be arranged simultaneously or also alternatively. The invention also encompasses variants in which the sensor is arranged on or in the vicinity of the specimen in the light cone of the illumination system, in order also to take into account any influences of the optical waveguide. Acoustic signal generator 6 that is depicted can have any desired form and embodiment; an energetically favorable embodiment would be, for example, a piezoelectric buzzer. The indication and the signal horn can be provided together or alternatively. The mounting location of these components is selectable depending on the user's needs; it can be directly on microscope 7 or also directly on the housing of light source 1.

The light generated by lamp 1 is focused by a cold light reflector 11 onto optical waveguide 2. Since this focusing does not occur completely onto the entrance surface of optical waveguide 2, the intensity of lamp 1 can be sensed next to optical waveguide 2 by way of a sensor 3a. This sensed quantity is converted into electrical signals and conveyed to an electronic unit 4. Within that unit, the signal values are compared to a specific definable light reduction threshold value and/or a specific definable light increase threshold value. If the signal value falls below the light reduction threshold or exceeds the light increase threshold, that fact is reported to user 9 by means of an indication 5 and/or an acoustic signal of a signal generator 6 and/or an indication unit 12 on microscope 7. The user then decides whether he or she wishes to change lamp 1 immediately, or to continue working for a while and then change the lamp manually or by way of a lamp changer.

In a variant of the arrangement described above, light sensor 3b is arranged on the back side of cold light reflector 11. Since the cold light reflector reflects only the visible wavelength regions but not those in the non-visible region, an intensity measurement is possible here as well.

In addition, an electronic unit 4 is equipped with a control system in order to keep the light intensity of lamp 1 constant over a certain portion of its lifetime. The user thus always has available the same luminance at the specimen, depending on the potentiometer setting selected by him or her; this is a favorable situation for the user in terms of surgical technique.

Although the text above refers in detail to a surgical microscope, the invention is not limited thereto but rather is also usable in corresponding fashion in the context of other illumination apparatuses, e.g. projectors, illumination systems for video and photographic cameras, etc.

PARTS LIST

1 Lamp
2 Optical waveguide
3a, 3b Light sensor(s)
4 Electronic unit
5 Indication and brightness adjustment system
6 Acoustic signal generator
7 Microscope
8 Reflecting-in unit
9 User
10 Specimen
11 Cold light reflector
12 Indication unit

What is claimed is:

1. A light source for an optical viewing device, said light source comprising:

a lamp (1);

at least one light sensor (3a, 3b) for measuring an intensity of light delivered by said lamp (1) and generating an intensity signal representative of said measured light intensity;

an electronic unit (4) connected to said at least one light sensor (3a, 3b) for comparing said intensity signal to a predefined light reduction threshold value; and indicating means connected to said electronic unit (4) for providing an indication to a user (9) if said intensity signal is below said predefined light reduction threshold value, wherein said indicating means comprises an indication unit (12) on said optical viewing device, wherein said indication unit (12) provides a visible indication arranged to be reflected directly into an intermediate image of said optical viewing device (7) by a reflecting-in unit (8) of said optical viewing device (7).

2. A light source for an optical viewing device, said light source comprising:

a lamp (1);

a cold light reflector for focusing light delivered by said lamp onto an entrance of an optical waveguide for transporting light to said optical viewing device;

at least one light sensor (3a, 3b) for measuring an intensity of light delivered by said lamp (1) and generating an intensity signal representative of said measured light intensity, said at least one light sensor including a light sensor arranged behind said cold light reflector for measuring the intensity of light of non-reflected wavelengths;

an electronic unit (4) connected to said at least one light sensor (3a, 3b) for comparing said intensity signal to a predefined light reduction threshold value; and indicating means connected to said electronic unit (4) for providing an indication to a user (9) if said intensity signal is below said predefined light reduction threshold value.

3. A light source for an optical viewing device, said light source comprising:

a lamp (1);

at least one light sensor (3a, 3b) for measuring an intensity of light delivered by said lamp (1) and generating an intensity signal representative of said measured light intensity;

an electronic unit (4) connected to said at least one light sensor (3a, 3b) for comparing said intensity signal to a predefined light reduction threshold value, wherein said electronic unit (4) includes calibration means for assigning a reference value to an intensity signal associated with a new lamp, and said light reduction threshold value is definable as a percentage of said reference value; and indicating means connected to said electronic unit (4) for providing an indication to a user (9) if said intensity signal is below said predefined light reduction threshold value.

4. A light source for an optical viewing device, said light source comprising:

a lamp (1);

at least one light sensor (3a, 3b) for measuring an intensity of light delivered by said lamp (1) and generating an intensity signal representative of said measured light intensity;

an electronic unit (4) connected to said at least one light sensor (3a, 3b) for comparing said intensity signal to a predefined light reduction threshold value, wherein said electronic unit includes a control system for keeping light intensity delivered by said lamp (1) constant over a certain portion of a lifetime of said lamp, and wherein said electronic unit (4) includes calibration means for assigning a reference value to an intensity signal associated with a new lamp, and said control system maintains intensity of light delivered by said lamp at a level represented by said reference value; and indicating means connected to said electronic unit (4) for providing an indication to a user (9) if said intensity signal is below said predefined light reduction threshold value.

* * * * *